US007516528B2

(12) United States Patent
Lemarchand et al.

(10) Patent No.: US 7,516,528 B2
(45) Date of Patent: Apr. 14, 2009

(54) METHOD FOR THE MANUFACTURE OF AN X-RAY TUBE CATHODE FILAMENT

(75) Inventors: Gwenael Lemarchand, Limours (FR); Jean-Marie Penato, Les Essarts le Roj (FR)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 616 days.

(21) Appl. No.: 10/983,024

(22) Filed: Nov. 4, 2004

(65) Prior Publication Data

US 2005/0130549 A1 Jun. 16, 2005

(51) Int. Cl.

| | |
|---|---|
| ***B23P 17/00*** | (2006.01) |
| ***B05D 5/12*** | (2006.01) |
| ***H01J 1/15*** | (2006.01) |

(52) U.S. Cl. ............................ 29/418; 29/423; 29/458; 29/527.2; 427/449; 427/111; 264/309; 445/28

(58) Field of Classification Search .................. 29/418, 29/423, 428, 458, 527.1, 527.2, 557; 427/449, 427/111, 163.2; 264/299, 300, 309, 337, 264/338, DIG. 72, DIG. 57; 445/28; 378/122
See application file for complete search history.

(56) References Cited

U.S. PATENT DOCUMENTS

| | | | | | |
|---|---|---|---|---|---|
| 1,495,632 | A | * | 5/1924 | De Raphelis-Soissan | 156/56 |
| 3,017,284 | A | * | 1/1962 | Lambert et al. | 427/135 |
| 3,084,088 | A | * | 4/1963 | Hunkeler | 264/102 |
| 3,623,220 | A | * | 11/1971 | Chase et al. | 29/598 |
| 3,631,291 | A | * | 12/1971 | Favreau | 313/345 |
| 3,681,643 | A | * | 8/1972 | Blatter | 313/337 |
| 3,788,721 | A | * | 1/1974 | Vause | 445/27 |
| 4,460,529 | A | * | 7/1984 | Schultze et al. | 264/81 |
| 4,533,852 | A | | 8/1985 | Lydtin et al. | |
| 4,877,642 | A | | 10/1989 | Lydtin et al. | |
| 5,283,085 | A | | 2/1994 | Gaertner et al. | |
| 5,668,434 | A | * | 9/1997 | Kim et al. | 313/346 R |

* cited by examiner

*Primary Examiner*—Jermie E Cozart
(74) *Attorney, Agent, or Firm*—GE Global Patent Operation

(57) ABSTRACT

A method for the manufacture of a cathode filament of an X-ray tube and an X-ray tube formed by the method wherein the filament has at least two legs and one body, the filament being a single-piece filament. Spraying at least one material on a support by plasma spraying or by another deposition technique to obtain the filament molded on the support and separating the filament obtained from the support. The filament obtained has a variable thickness and a variable composition. The thicknesses of the legs and of the body as well as the composition of the filament can be modified according to the user's needs.

50 Claims, 1 Drawing Sheet

METHOD FOR THE MANUFACTURE OF AN X-RAY TUBE CATHODE FILAMENT

CROSS-REFERENCE TO RELATED APPLICATIONS

This application claims the benefit of a priority under 35 USC 119(a)-(d) to French Patent Application No. 03 51033 filed Dec. 12, 2003, the entire contents of which are hereby incorporated by reference.

BACKGROUND OF THE INVENTION

An embodiment of the present invention relates to a method for the manufacture of an X-ray tube cathode filament. More specifically, an embodiment of the invention relates to a method that can be used to obtain a single-piece cathode filament. An embodiment of the invention also relates to an X-ray tube provided with a cathode filament of this kind.

An embodiment of the invention can be applied to X-ray tubes and particularly to tubes used in mammography, in devices used to study the vascular system or in scanners. In medicine, the device used generally as a cathode that emits electron beams is a cathode filament. At least one anode is positioned facing the cathode filament. The electrons emitted by the cathode filament strike the anode at high speed. The anode then emits X-rays.

For use in medicine, X-ray production requires great precision in the positioning of the cathode relative to the anode. Variations of more than 10 micrometers in the position of one of these elements relative to its expected position can have a deleterious effect on the strict control of X-ray production. During X-ray production, the cathode filament reaches a temperature of about 2800 degrees Celsius. The cathode filament therefore undergoes expansion. The expansion of the cathode filament may cause said cathode filament to shift in relation to the anode. This expansion can cause a break in the filament.

There is a known cathode filament comprising three parts: a filament body that is carried by two legs. The body of the filament emits electrons. The two legs of the filament are mutually parallel and perpendicular to the body of the filament. The legs are respectively soldered to two opposite ends of the body. Not only does the soldering method entail a delicate operation but it also causes the cathode filament to become brittle at the position of these solder zones. There is a risk that the filament will break at the position of these solder zones during an expansion.

To resolve the problem of mechanical embrittlement between the body and the legs of the filament, there is a known way of using a single-piece cathode filament. This filament is made out of the single plate curved in a U shape. Thus the two legs in the body forming the filament are made in one piece. The soldering step is eliminated.

The single-piece filament obtained is mechanically robust. However, the thickness of the legs is identical to that of the body. The rigidity of the filament obtained is therefore great. During the use of the X-ray tube provided with a cathode filament of this kind, the body of the cathode filament is subjected to expansion to a greater degree than are the legs. The mechanical resistance of the body is diminished, causing it to undergo shifts. The body of the filament has a length that increases owing to this expansion. Since the legs undergo less expansion, they have great rigidity and prevent the body of the filament from stretching. The body of the filament is therefore subjected to plastic deformation to the extent of getting curved. The positioning of the cathode relative to the anode is therefore modified in relation to the initial positioning. Once deformed, the filament body emits electrons in every direction. In medical engineering, it is often desired that the electron-emitting surface should remain perpendicular to the anode facing it. If the body is deformed uncontrollably, the filament can no longer be used.

The prior art cathode filaments are therefore not satisfactory. A filament having its body soldered to two legs risks breakage at the position of the solder zones when the filament undergoes expansion. There is a risk that the single-piece filament will get deformed during expansion, modifying the anode-cathode distance. This is incompatible with efficient operation of the X-ray tube that contains it.

BRIEF DESCRIPTION OF THE INVENTION

In an embodiment of the invention, these problems are resolved by the manufacture, according to a disclosed method, of a single-piece cathode filament in which the thickness of the legs may differ from that of the body. Since the filament obtained in an embodiment of the invention is a single-piece filament, any risk of breakage of the legs relative to the body of the filament is generally avoided. Furthermore, since the thicknesses of the legs and of the body are independent, these thicknesses can be modified in order to make legs that are flexible in relation to the body. Thus, when the filament undergoes expansion, the legs may spread apart outwards. It is therefore possible to have a plane elongation of the body of the filament that does not modify the distance between the cathode and the anode facing it. The cathode filament that it is proposed to make is such that the legs have sufficient flexibility to absorb the deformations of the body of the filament subjected to expansion.

An embodiment of the invention is directed to a method for the manufacture of a cathode filament of an X-ray tube, the filament comprising at least two legs and one body, the filament being a single-piece filament. An embodiment of the method comprises spraying at least one material on a support by, for example, plasma spraying, or another deposition technique to obtain the filament molded on the support and separating the filament obtained from the support. An embodiment of the invention is also directed to an X-ray tube provided with at least one cathode filament provided by an embodiment of the method.

BRIEF DESCRIPTION OF THE DRAWINGS

An embodiment of the invention will be understood more clearly from the following description and the accompanying figures. These figures are given purely by way of an indication and in no way restrict the scope of the invention. Of these figures.

DETAILED DESCRIPTION OF THE INVENTION

In an embodiment of the invention, it is proposed to make a cathode filament by plasma spraying. Plasma spraying is a thermal spraying process. A product that is solid, melted or softened by means of a heat source is sprayed in the form of fine particles on a surface prepared beforehand. The combustion energy from a plasma jet is used for this purpose. The plasma is an ionized medium, i.e., a medium constituted by mixture of ions, electrons and neutral species that may or may not be excited. To carry out the plasma spraying, a torch comprising two electrodes is used. The torch takes the form of a conical cathode within a cylindrical anode forming a nozzle. An inert gas such as argon flows between the two electrodes where it is ionized to form a plasma. A tube is used to introduce the material to be sprayed in powder form into the plasma jet. The material to be sprayed is itself carried by a neutral gas. The sprayed particles reached the substrate in a highly melted state, at high speeds in the range of some hundreds of meters per second. They crash into the substrate and cool down very swiftly, and then get stacked on one another, thus gradually forming a deposit.

In an embodiment of the invention, plasma spraying is used to manufacture a filament out of a desired material.

Figure 1:
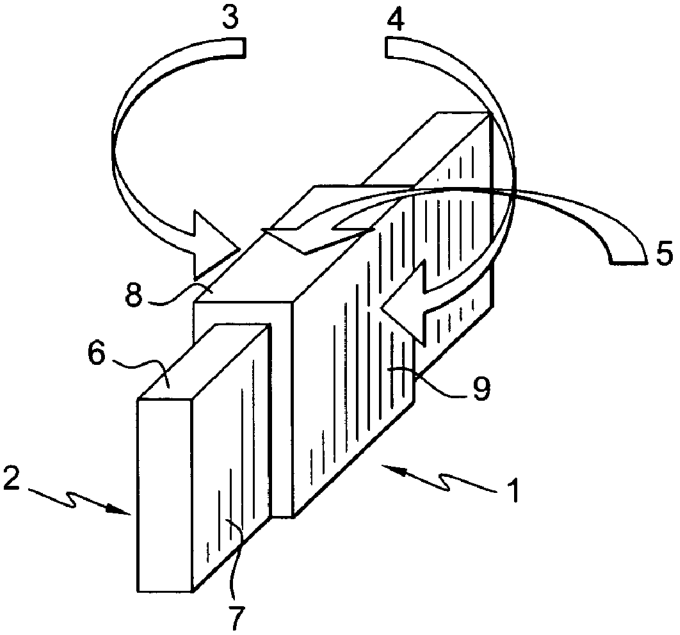
FIG. 1 is a general view of an operation of plasma spraying, for example, of a material on a support to form a filament.

FIG. 1 shows a filament 1 made by plasma spraying on a support 2. The process starts by the manufacture of a support 2 whose external contour corresponds to the contour that is to be obtained for the filament 1. Depending on the mechanical characteristics to be assigned to the cathode filament 1, one or more materials are chosen for spraying in powder form on the support. For example, tungsten powder is sprayed. Thus, at the end of the plasma spraying operation, a cathode filament 1 made of tungsten is obtained.

In another exemplary embodiment, the plasma sprayed can be an alloy of tungsten powder and rhenium powder. In particular, the tungsten/rhenium mixture obtained gives anti-ageing properties to cathode filament 1. It is known that tungsten forms macro-crystals when it ages. These macro-crystals embrittle the structure or reduce the rigidity of the filament 1. As for rhenium, it is known to limit the spread of these macro-crystals throughout the structure forming the filament 1. Thus, manufacturing a rhenium-tungsten filament of this kind increases the lifetime of the cathode filament 1.

In another exemplary embodiment, it is also possible to carry out several successive plasma-spraying operations, in using a different material each time. Thus, the cathode filament 1 obtained is a single-piece unit but one with a mixed composition. In other words the cathode filament is formed by several successive layers of different materials. The materials used may be chosen as a function of their mechanical or chemical properties, depending on the user's needs.

In an embodiment of the method of manufacture of the cathode filament 1 by plasma spraying gives a cathode filament 1 of the required thickness. The thickness of the filament 1 will vary according to the time during which the support is subjected to plasma spraying. A part 6 of the support 2 on which a body 8 of the filament 1 is molded can also be subjected to plasma spraying 5 for a period of time that is greater than the period of time during which plasma spraying operations 3 and 4 are applied to parts 7 of the support 2 on which legs 9 of the filament 1 are molded.

Figure 2:
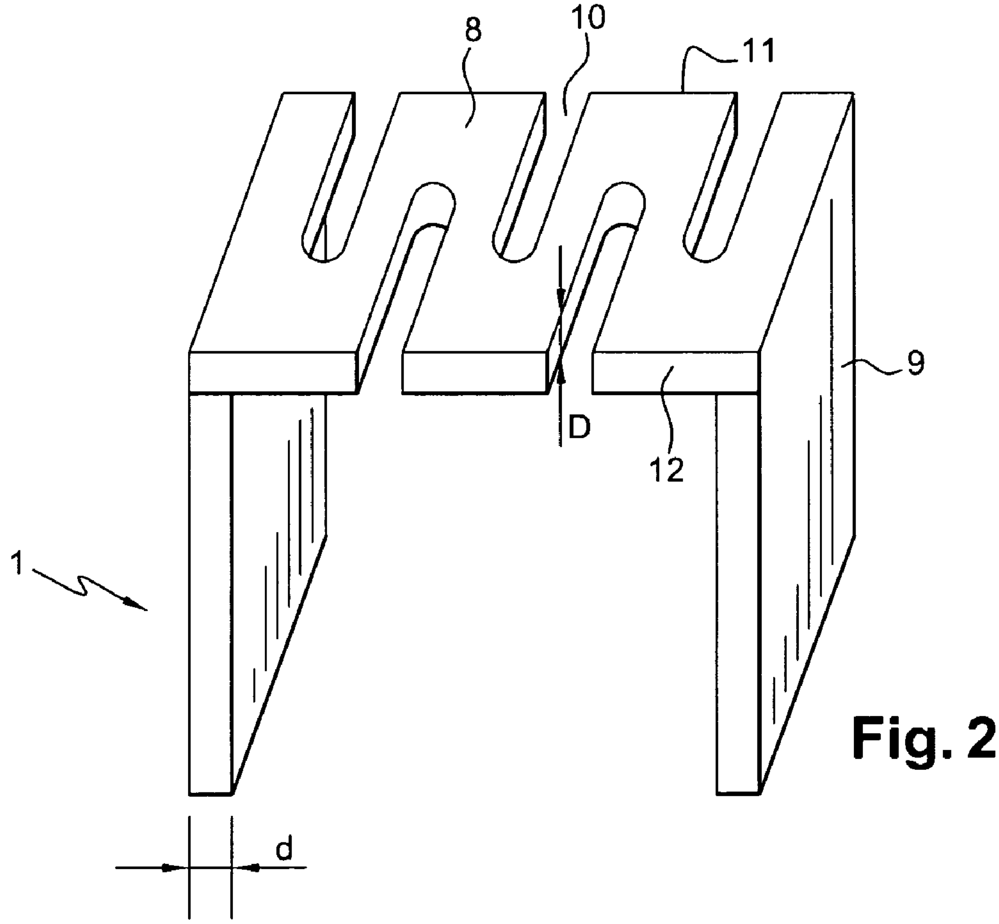
FIG. 2 shows a cathode filament obtained.

Thus, as shown in FIG. 2, it is possible to make a filament 1 whose body 8 has a thickness D greater than a thickness d of the legs 9. The legs 9 are thus more flexible than the body 8. This flexibility of the legs 9 relative to the body 8 of the filament 1 enables the body 8 to stretch in a rectilinear, plane way while the legs 9 respectively get twisted outwards relative to the body 8 of the filament 1. For example, the body 8 has a thickness D ranging from 100 to 300 microns, and the legs 7 has a thickness d ranging from 50 to 150 microns. In one particular example, the thickness d of the two legs 9 is identical. In one particular exemplary embodiment of the invention, a cathode filament 1 is made with its body 8 having a thickness D of about 200 microns, and its legs 9 having a thickness of about 100 microns.

An embodiment of the manufacturing method of the invention comprises spraying, on a previously manufactured support 2, of one or more materials by plasma spraying 3, 4, and 5. The filament 1 thus obtained is recovered by separating the filament 1 from the support 2. The support 2 can be made out of one or more materials such that the support 2 can subsequently be selectively dissolved in a chemical bath. The term "selectively dissolved" is understood to mean that only the support 2 is dissolved, the filament 1, for its part being non-dissolvable in the chemical solution. In one exemplary embodiment of the invention, the support 2 can be made out of an alloy of titanium or molybdenum. Tungsten powder is then sprayed on this support 2. Once the desired cathode filament 1 is obtained, with one or more desired thicknesses d and D, the unit formed by the tungsten filament 1 and the titanium, zirconium and molybdenum support 2 is dipped into a special solution in which the support 2 is dissolved but not the filament 1.

In another exemplary embodiment of the invention, the support 2 can be made of graphite. Graphite cannot be selectively dissolved by a chemical solution. However, it can be planned to coat the graphite support 2 with a selectively and chemically dissolvable intermediate layer. For example, an intermediate layer of rhenium is sprayed on the graphite support 2 by plasma spraying. The rhenium is, for example, selectively dissolved in a solution containing nitric acid. Thus, once the support 2 is coated with the intermediate layer of rhenium, plasma spraying 3, 4, and 5 is carried out with the material or materials chosen to form the cathode filament 1. The unit formed by the support 2 and filament 1 is then dipped into a bath containing nitric acid at 40-50° C., for a period of time ranging from 1 to 15 minutes, depending on the thickness of the intermediate layer of rhenium to be dissolved. Once the intermediate layer of rhenium is dissolved, the cathode filament 1 and graphite support 2 are recovered separately.

In an embodiment of the method of the invention, it is possible to manufacture cathode filaments 1 of all shapes. Depending on the external contour of the support 2, the filament 1 will have a different contour.

It also possible to make the body 8 of the cathode filament 1 with a winding shape as shown in FIG. 2. The machining is done for example by electro-erosion. The term "electro-erosion" is understood to mean wire-cutting. The wire is driven rotationally at high speed in order to form an electrical arc between the wire and the parts to be cut. When the wire is brought close to the part to be cut, matter is liberated very precisely. Thus, notches 10 can be made with widths ranging from 40 to 80 microns, and preferably 50 to 60 microns, and with depths ranging from 0.5 to 3 mm, preferably 1.5 mm. Depending on the user's needs, and the initial length of the body 8 of the filament 1, it is possible to make a varied number of notches 10. In one particular exemplary embodiment of the invention, 10 identical notches are made, and distributed in a quincunx arrangement on each side 11 and 12 of the body 8 of the filament 1.

In an exemplary implementation of the method, the filament 1 is machined when it is still on the support 2. Once the notches 10 have been machined on the filament 1 and on the support 2, this support 2 is dissolved to recover the winding filament 1.

According to another exemplary implementation of the method, it is also possible to dissociate the filament 1 from the support 2, before machining the notches 10. The mechanical resistance of the filament 1 obtained by an embodiment of the method of the invention may be sufficient to enable a machining of the filament 1 dissociated from the support 2.

An embodiment of the method of manufacture of the cathode filament 1 can be used to obtain a single-piece filament 1 with desired and variable thicknesses d and D. These thicknesses d and D may be different at the positions of the body 8 and legs 9, but the thicknesses d of the legs 9 may also be different from one another. It is also possible to modify the mechanical properties of the filament 1 by choosing an appropriate material to carry out the plasma spraying. It is also possible to combine chemical and mechanical properties of the different materials to form a filament 1 made out of a particular alloy, meeting precise requirements. It is possible to make a filament 1 of complex shape, simply, without any soldering step that might embrittle the filament 1.

The filament 1 obtained by an embodiment of the method provides a sure positioning of the cathode relative to the anode (which is not shown). The expansion undergone by the body 8 of the filament 1 does not modify the position of said body 8 relative to the anode. As a consequence of the flexibility of the legs 9 relative to the body 8 of the filament 1, the body 8 stretches in a rectilinear and plane sense, while the legs 9 respectively get twisted outwards relative to the body 8 of the filament 1.

An embodiment of the invention also relates to an X-ray tube provided with a cathode filament 1 made according to any variant of implementation of the method that has just been described.

One skilled in the art may make or propose various modifications to the function and/or way and/or result and/or the structure and/or the steps of the disclosed embodiments and equivalents thereof without departing from the scope and extent of the invention.

What is claimed is:

1. A method for the manufacture of a cathode filament of an X-ray tube comprising:

providing a filament having at least two legs and one body, the filament being a single-piece filament;

spraying at least one material on a support by plasma spraying, to obtain the filament molded on the support; and separating the filament obtained from the support.

2. The method according to claim 1, wherein the material is sprayed by plasma spraying to form the filament is tungsten.

3. The method according to claim 2, wherein the material is sprayed by plasma spraying to form the filament are an alloy of tungsten and rhenium.

4. The method according to claim 2, comprising:

successively spraying different materials on the support by plasma spraying to form a filament of mixed composition.

5. The method according to claim 2, comprising:

carrying out the plasma spraying so as to obtain the filament whose legs have a thickness different from a thickness of the body of the filament.

6. The method according to claim 2, wherein the thickness of the body ranges from 100 microns to 300 microns, and the thickness of the legs ranges from 50 microns to 150 microns.

7. The method according to claim 2, comprising:

making the support out of a selectively and chemically dissolvable material; and dissolving the support once the filament has been made by plasma projection.

8. The method according to claim 2, wherein the support is formed by an alloy of titanium, zirconium and molybdenum.

9. The method according to claim 2, comprising:

making the support out a material that is not chemically dissolvable;

coating the support, by plasma spraying, with an intermediate layer formed by a selectively and chemically dissolvable material; and dissolving the intermediate layer once the filament is made by plasma.

10. The method according to claim 2, comprising:

machining the body of the filament so as to obtain a body with a winding shape.

11. The method according claim 1, wherein the material is sprayed by plasma spraying to form the filament are an alloy of tungsten and rhenium.

12. The method according to claim 11, comprising:

successively spraying different materials on the support by plasma spraying to form a filament of mixed composition.

13. The method according to claim 11, comprising:

carrying out the plasma spraying so as to obtain the filament whose legs have a thickness different from a thickness of the body of the filament.

14. The method according to claim 11, wherein the thickness of the body ranges from 100 microns to 300 microns, and the thickness of the legs ranges from 50 microns to 150 microns.

15. The method according to claim 11, comprising:

making the support out of a selectively and chemically dissolvable material; and dissolving the support once the filament has been made by plasma projection.

16. The method according to claim 11, wherein the support is formed by an alloy of titanium, zirconium and molybdenum.

17. The method according to claim 11, comprising:

making the support out a material that is not chemically dissolvable;

coating the support, by plasma spraying, with an intermediate layer formed by a selectively and chemically dissolvable material; and dissolving the intermediate layer once the filament is made by plasma.

18. The method according to claim 11, comprising:

machining the body of the filament so as to obtain a body with a winding shape.

19. The method according to claim 1, comprising:

successively spraying different materials on the support by plasma spraying to form a filament of mixed composition.

20. The method according to claim 19, comprising:

carrying out the plasma spraying so as to obtain the filament whose legs have a thickness different from a thickness of the body of the filament.

21. The method according to claim 19, wherein the thickness of the body ranges from 100 microns to 300 microns, and the thickness of the legs ranges from 50 microns to 150 microns.

22. The method according to claim 19, comprising:

making the support out of a selectively and chemically dissolvable material; and dissolving the support once the filament has been made by plasma projection.

23. The method according to claim 19, wherein the support is formed by an alloy of titanium, zirconium and molybdenum.

24. The method according to claim 19, comprising:

making the support out a material that is not chemically dissolvable;

coating the support, by plasma spraying, with an intermediate layer formed by a selectively and chemically dissolvable material; and dissolving the intermediate layer once the filament is made by plasma.

25. The method according to claim 19, comprising:

machining the body of the filament so as to obtain a body with a winding shape.

26. The method according to claim 1, comprising:

carrying out the plasma spraying so as to obtain the filament whose legs have a thickness different from a thickness of the body of the filament.

27. The method according to claim 26 wherein the thickness of the body ranges from 100 microns to 300 microns, and the thickness of the legs ranges from 50 microns to 150 microns.

28. The method according to claim 27, comprising:

making the support out of a selectively and chemically dissolvable material; and dissolving the support once the filament has been made by plasma projection.

29. The method according to claim 27, wherein the support is formed by an alloy of titanium, zirconium and molybdenum.

30. The method according to claim 27, comprising;

making the support out a material that is not chemically dissolvable;

coating the support, by plasma spraying, with an intermediate layer formed by a selectively and chemically dissolvable material; and dissolving the intermediate layer once the filament is made by plasma.

31. The method according to claim 27, comprising:

machining the body of the filament so as to obtain a body with a winding shape.

32. The method according to claim 26, comprising:

making the support out of a selectively and chemically dissolvable material; and dissolving the support once the filament has been made by plasma projection.

33. The method according to claim 26, wherein the support is formed by an alloy of titanium, zirconium and molybdenum.

34. The method according to claim 26, comprising:

making the support out a material that is not chemically dissolvable;

coating the support, by plasma spraying, with an intermediate layer formed by a selectively and chemically dissolvable material; and dissolving the intermediate layer once the filament is made by plasma.

35. The method according to claim 26, comprising:

machining the body of the filament so as to obtain a body with a winding shape.

36. The method according to claim 1, comprising:

making the support out of a selectively and chemically dissolvable material; and dissolving the support once the filament has been made by plasma projection.

37. The method according to claim 36, wherein the support is formed by an alloy of titanium, zirconium and molybdenum.

38. The method according to claim 37, comprising:

machining the body of the filament so as to obtain a body with a winding shape.

39. The method according to claim 36, comprising:

machining the body of the filament so as to obtain a body with a winding shape.

40. The method according to claim 1, comprising:

making the support out a material that is not chemically dissolvable;

coating the support, by plasma spraying, with an intermediate layer formed by a selectively and chemically dissolvable material; and dissolving the intermediate layer once the filament is made by plasma spraying.

41. The method according to claim 40, wherein the non-dissolvable support is made of graphite and the material forming the intermediate layer is rhenium.

42. The method according to claim 41, comprising:

machining the body of the filament so as to obtain a body with a winding shape.

43. The method according to claim 40, comprising:

machining the body of the filament so as to obtain a body with a winding shape.

44. The method according to claim 1, comprising:

machining the body of the filament so as to obtain a body with a winding shape.

45. The method according to claim 44, comprising:

machining the body of the filament on the support; and separating the machined filament from the support.

46. The method according to claim 45, wherein the body of the filament is machined by electro-erosion.

47. The method according to claim 44 comprising:

separating the filament from the support; and machining the body of the filament.

48. The method according to claim 47, wherein the body of the filament is machined by electro-erosion.

49. The method according to claim 44, wherein the body of the filament is machined by electro-erosion.

50. The method according to claim 1, wherein the thicknesses of the legs and the body are independent.

* * * * *